US011644950B2

(12) United States Patent
Wheeler et al.

(10) Patent No.: US 11,644,950 B2
(45) Date of Patent: *May 9, 2023

(54) DYNAMIC THUMBNAIL REPRESENTATION FOR A VIDEO PLAYLIST

(71) Applicant: Google LLC, Mountain View, CA (US)

(72) Inventors: Aaron Joseph Wheeler, San Francisco, CA (US); Chris Lauritzen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,142

(22) Filed: Nov. 26, 2018

(65) Prior Publication Data

US 2019/0095061 A1 Mar. 28, 2019

Related U.S. Application Data

(63) Continuation of application No. 15/248,865, filed on Aug. 26, 2016, now Pat. No. 10,139,992, which is a
(Continued)

(51) Int. Cl.
*G06F 3/0482* (2013.01)
*G06F 3/0485* (2022.01)
(Continued)

(52) U.S. Cl.
CPC .......... *G06F 3/0482* (2013.01); *G06F 3/0485* (2013.01); *G06F 3/04817* (2013.01);
(Continued)

(58) Field of Classification Search
CPC ...... G06F 3/0482; G06F 16/743; G06F 16/44; G06F 16/252; G06F 16/438;
(Continued)

(56) References Cited

U.S. PATENT DOCUMENTS 6,456,334 B1 * 9/2002 Duhault ............. H04N 21/4263
348/E5.122
6,774,917 B1 * 8/2004 Foote ................. G06K 9/00758
715/700
(Continued)

FOREIGN PATENT DOCUMENTS

EP 1521468 4/2005
WO WO 2007/133668 11/2007

OTHER PUBLICATIONS

Examination Report dated May 16, 2019 in EP Patent Application No. 14868152.1.
(Continued)

*Primary Examiner* — Jennifer N Welch
*Assistant Examiner* — Parmanand D Patel
(74) *Attorney, Agent, or Firm* — Byrne Poh LLP

(57) ABSTRACT

A video playlist associated with a set of videos is distinguished in a graphical user interface using a dynamic thumbnail to represent the playlist. The dynamic thumbnail comprises a static portion comprising a first image associated with the set of videos and a dynamic portion comprising one or more second images associated with the set of videos. An image provided in the dynamic portion is configured to change while the first image remains the same in response to a shift in the graphical user interface that results in a change in position of the thumbnail about the user graphical user interface.

21 Claims, 14 Drawing Sheets

Related U.S. Application Data continuation of application No. 14/095,191, filed on Dec. 3, 2013, now Pat. No. 9,454,289.

(51) Int. Cl.

| | | |
|---|---|---|
| *G06F 3/0481* | (2022.01) | |
| *G06F 16/44* | (2019.01) | |
| *G06F 16/25* | (2019.01) | |
| *G06F 16/438* | (2019.01) | |
| *G06F 3/04817* | (2022.01) | |
| *G06F 16/74* | (2019.01) | |
| *G06F 16/432* | (2019.01) | |
| *G06F 16/738* | (2019.01) | |
| *G06F 16/732* | (2019.01) | |
| *G06F 3/0488* | (2022.01) | |

(52) U.S. Cl.
CPC .......... *G06F 16/252* (2019.01); *G06F 16/438* (2019.01); *G06F 16/44* (2019.01); *G06F 16/743* (2019.01); *G06F 3/0488* (2013.01); *G06F 16/434* (2019.01); *G06F 16/4387* (2019.01); *G06F 16/739* (2019.01); *G06F 16/7328* (2019.01)

(58) Field of Classification Search
CPC .. G06F 3/04817; G06F 3/0485; G06F 16/434; G06F 16/739; G06F 16/4387; G06F 16/7328; G06F 3/0488
See application file for complete search history.

(56) References Cited

U.S. PATENT DOCUMENTS

| | | | |
|---|---|---|---|
| 7,152,210 B1 * | 12/2006 | Van Den Hoven | ... G06F 3/0482 715/723 |
| 8,875,022 B2 | 10/2014 | Yun et al. | |
| 2005/0243381 A1 | 11/2005 | Hill et al. | |
| 2007/0274676 A1 | 11/2007 | Diomelli et al. | |
| 2008/0034306 A1 | 2/2008 | Ording | |
| 2008/0086688 A1 | 4/2008 | Chandratillake et al. | |
| 2008/0147711 A1 | 6/2008 | Spiegelman et al. | |
| 2008/0148152 A1 | 6/2008 | Blinnikka et al. | |
| 2008/0180394 A1 | 7/2008 | Yun et al. | |
| 2008/0225153 A1 | 9/2008 | Fagans | |
| 2009/0100462 A1 | 4/2009 | Park et al. | |
| 2009/0106700 A1 | 4/2009 | Nobori et al. | |
| 2009/0153389 A1 | 6/2009 | Kerr et al. | |
| 2009/0172543 A1 * | 7/2009 | Cronin | ............... G06F 3/04847 715/721 |
| 2010/0070523 A1 * | 3/2010 | Delgo | .................... G11B 27/28 707/769 |
| 2010/0262911 A1 * | 10/2010 | Kaplan | ................ G11B 27/105 715/719 |
| 2011/0243397 A1 * | 10/2011 | Watkins | .............. G06F 16/5854 715/830 |

OTHER PUBLICATIONS

International Preliminary Report on Patentability and Written Opinion of the International Searching Authority dated Jun. 7, 2016 in International Patent Application No. PCT/US2014/067679.
International Search Report of the International Searching Authority dated Mar. 13, 2015 in International Patent Application No. PCT/US2014/067679.
Notice of Allowance dated May 26, 2016 in U.S. Appl. No. 14/095,191.
Notice of Allowance dated Jul. 19, 2018 in U.S. Appl. No. 15/248,865.
Office Action dated Aug. 20, 2015 in U.S. Appl. No. 14/095,191.
Supplementary European Search Report dated Apr. 11, 2017 in EP Patent Application No. 14868152.1.
Tonomura, Y. et al., "Content Oriented Visual Interface Using Video Icons for Visual Database Systems", In Journal of Visual Languages and Computing, vol. 1, Jan. 1, 1990, pp. 183-198.
Office Action dated Jan. 31, 2019 in CN Patent Application No. 201480072198.2.
Examination Report dated Dec. 9, 2020 in IN Patent Application No. 201647018657.

* cited by examiner

1000

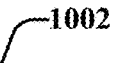
1002

GENERATING A GRAPHICAL USER INTERFACE COMPRISING A THUMBNAIL REPRESENTING A SET OF VIDEOS ASSOCIATED WITH A PLAYLIST, THE THUMBNAIL COMPRISING A STATIC PORTION COMPRISING A FIRST IMAGE ASSOCIATED WITH THE SET OF VIDEOS AND A DYNAMIC PORTION COMPRISING ONE OR MORE SECOND IMAGES ASSOCIATED WITH THE SET OF VIDEOS

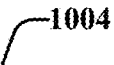
1004

CHANGING AT LEAST ONE OF A POSITION OF THE ONE OR MORE SECOND IMAGES PROVIDED IN THE DYNAMIC PORTION OR AN IMAGE INCLUDED IN THE ONE OR MORE SECOND IMAGES IN RESPONSE TO A SHIFT IN THE GRAPHICAL USER INTERFACE THAT RESULTS IN A CHANGE IN POSITION OF THE THUMBNAIL ABOUT THE USER GRAPHICAL USER INTERFACE

```
┌─────────────────────────────────────────────────────────────┐
│ GENERATING A GRAPHICAL USER INTERFACE COMPRISING A          │
│ THUMBNAIL REPRESENTING A SET OF VIDEOS ASSOCIATED WITH      │──1202
│ A PLAYLIST, THE THUMBNAIL COMPRISING A STATIC PORTION       │
│ COMPRISING A FIRST IMAGE ASSOCIATED WITH THE SET OF         │
│ VIDEOS AND A DYNAMIC PORTION HAVING A FIXED DISPLAY         │
│ AREA AND COMPRISING ONE OR MORE SECOND IMAGES               │
│ ASSOCIATED WITH THE SET OF VIDEOS                           │
└─────────────────────────────────────────────────────────────┘
                              ↓
┌─────────────────────────────────────────────────────────────┐
│ SHIFTING THE ONE OR MORE SECOND IMAGES FROM A FIRST         │──1204
│ POSITION TO A SECOND POSITION WITHIN THE FIXED DISPLAY      │
│ AREA IN RESPONSE TO A SHIFT IN THE GRAPHICAL USER           │
│ INTERFACE THAT RESULTS IN MOVEMENT OF THE THUMBNAIL,        │
│ WHEREIN THE SHIFTING COMPRISES SHIFTING THE ONE OR MORE     │
│ SECOND IMAGES AT A RATE OF MOVEMENT SLOWER THAN A RATE      │
│ OF MOVEMENT ASSOCIATED WITH THE SHIFT IN THE GRAPHICAL      │
│ USER INTERFACE                                              │
└─────────────────────────────────────────────────────────────┘
```

FIG. 12

DYNAMIC THUMBNAIL REPRESENTATION FOR A VIDEO PLAYLIST

CROSS-REFERENCE TO RELATED APPLICATIONS

This application is a continuation of U.S. patent application Ser. No. 15/248,865, filed Aug. 26, 2016, which is a continuation of U.S. patent application Ser. No. 14/095,191, filed Dec. 3, 2013, each of which is hereby incorporated by reference herein in its entirety.

TECHNICAL FIELD

This disclosure relates to system(s) and method(s) for distinguishing a playlist amongst other types of media items presented in a graphical user interface using a dynamic thumbnail to represent the playlist.

BACKGROUND

A thumbnail image associated with a video serves as a mechanism to attract users to select the video. The thumbnail image can serve as a strong impression tool to catch user's attention and provide a pictorial description of the contents of the video. However, a single image associated with a set of videos included in a playlist is generally an insufficient representation of the contents of the playlist. For example, it is difficult to capture the essence of a set of plurality of different videos with a single image.

BRIEF DESCRIPTION OF THE DRAWINGS

FIG. 10 is a flow diagram of an example method that facilitates generating an interface that includes a dynamic thumbnail representing a set of media items in accordance with various aspects and embodiments described herein.

FIG. 12 is a flow diagram of another example method that facilitates generating an interface that includes a dynamic thumbnail representing a set of media items in accordance with various aspects and embodiments described herein.

DETAILED DESCRIPTION

Figure 1:
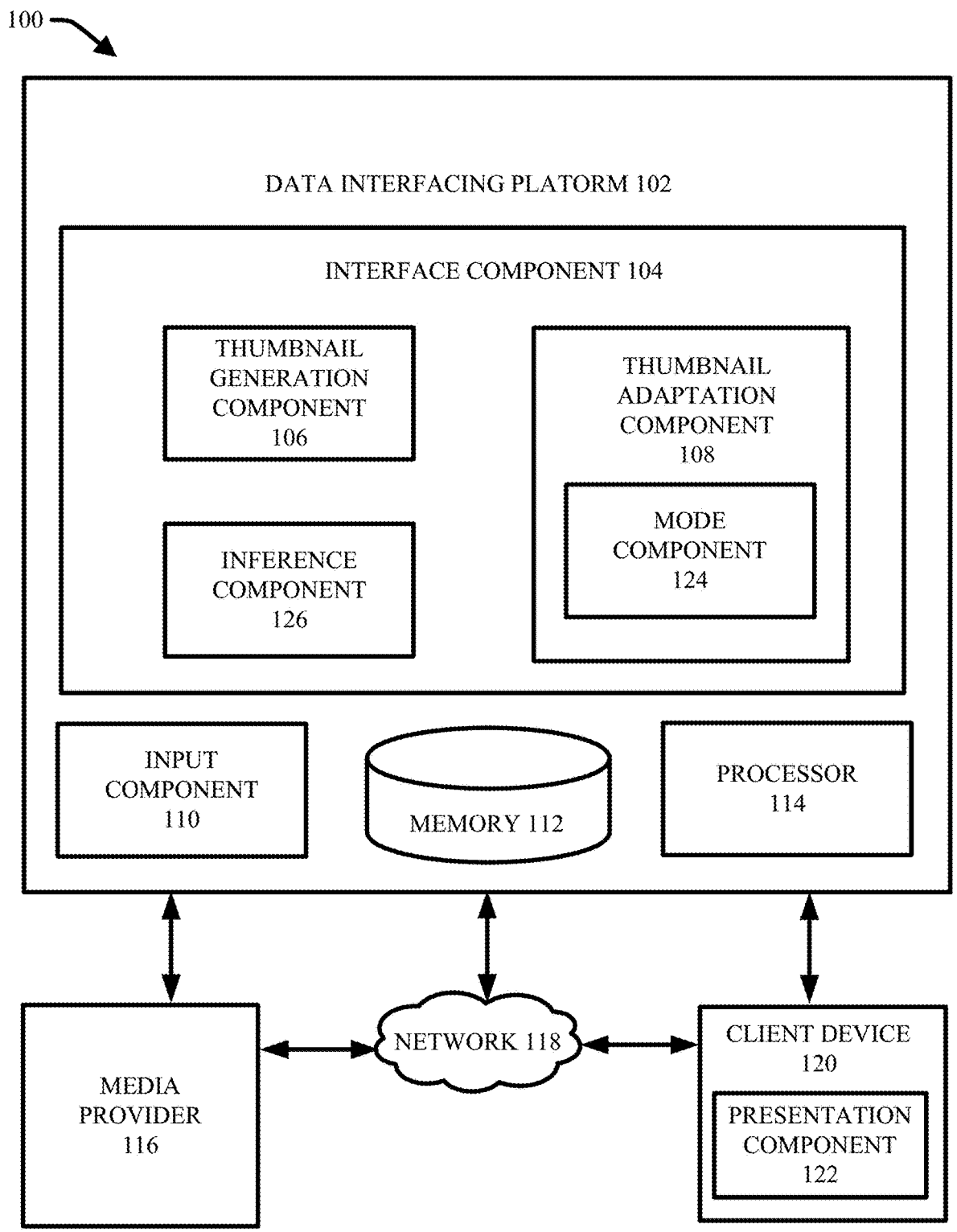
FIG. 1 illustrates a block diagram of an example system that facilitates generating an interface that includes a dynamic thumbnail representing a set of media items in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to distinguishing a set of content items, such as a set of videos associated with a playlist or channel, amongst other types of content items presented in a graphical user interface using a dynamic thumbnail to represent the set of content items. In an aspect, a system is disclosed that includes an interface component to configure and/or generate an interface for presentation at client device that includes at least a unique and dynamic thumbnail representing a set of content items. For example, the set of content items can include a set of videos grouped together in a media playlist, a set of videos associated with a channel, a collection of images associated with a slideshow, a collection of contacts associated with an address book, a set of articles associated with a new story, etc. The dynamic thumbnail can include features and/or functionality that distinguish the content represented by the thumbnail as a set of content items as opposed to an individual content item (e.g., an single video, a single song, a single image, a single article, etc.).

The dynamic thumbnail can include a static portion that includes a first image associated with a set of content items represented by the thumbnail. For example, the static portion can include a first image representative of a first video included in a video playlist or a general image representing the video playlist, where the dynamic thumbnail represents a video playlist. The dynamic thumbnail can further include a dynamic portion that includes one or more other images associated with the set of content items. For example, where the set of content items is a video playlist, the dynamic portion can include one or more other images respectively representing other videos in the playlist.

The dynamic portion is referred to as "dynamic" because the one or more other images provided in the dynamic portion are configured to change while the first image provided in the static portion remains the same. For example, the dynamic portion can be configured to present different images associated with the set of content items in response to movement of the thumbnail as a result of a shift in the interface including the thumbnail with respect to the dimensions of the display screen area of a client device at which the interface is presented (e.g., in response to scrolling up or down a page of the GUI that includes the thumbnail). According to this example, an image provided in the dynamic portion can be replaced with another image associated with the set of content items represented by the thumbnail in response to movement of the thumbnail. In another aspect, the dynamic portion of a thumbnail can include a fixed window in which images associated with the set of content items represented by the thumbnail scroll across in response to movement of the thumbnail. In another example, the dynamic portion can present different images associated with the set of content items over the course of time. According to this example, a new image can be displayed in the dynamic portion every X seconds, where X is a number.

In an aspect, a system is disclosed that includes an interface component configured to generate a graphical user interface that presents a thumbnail representing the set of content items. The thumbnail can include a static portion having a first image associated with the set of content items and a dynamic portion having one or more second images associated with the set of content items, wherein an image provided in the dynamic portion is configured to change while the first image remains the same in response to a shift in the graphical user interface that results in a change in position of the thumbnail about the user graphical user interface.

In another aspect, a method is provided that includes generating a graphical user interface that presents a thumbnail representing the set of content items. The thumbnail includes a static portion having a first image associated with the set of content items and a dynamic portion having one or more second images associated with the set of content items. The method further includes, changing at least one of a position of the one or more second images provided in the dynamic portion or an image included in the one or more second images in response to a shift in the graphical user interface that results in a change in position of the thumbnail about the user graphical user interface.

Further provided is a tangible computer-readable storage medium comprising computer-readable instructions that, in response to execution, cause a computing system to perform various operations. The operations can include generating a graphical user interface comprising a thumbnail representing a set of videos associated with a playlist, the thumbnail comprising a static portion comprising a first image associated with the set of videos and a dynamic portion comprising one or more second images associated with the set of videos. The operations further include changing at least one of a position of the one or more second images provided in the dynamic portion or an image included in the one or more second images in response to a shift in the graphical user interface that results in a change in position of the thumbnail about the user graphical user interface.

Referring now to the drawings, with reference to FIG. 1, presented is a system 100 having a data interfacing platform 102 that facilitates generating a graphical user interface that distinguishes a set or group of content items amongst other types of content items presented in the graphical user interface using a dynamic thumbnail to represent the set of content items, in accordance with aspects and embodiments described herein. Aspects of the systems, apparatuses or processes described in this disclosure can constitute machine-executable component embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. System 100 can include memory 112 (in association with data interfacing platform 102, media provider 116 and/or client device 120) for storing computer executable components and instructions. System 100 further includes a processor 114 (in association with data interfacing platform 102, media provider 116 and/or client device 120) to facilitate operation of the instructions (e.g., computer executable components and instructions) by system 100.

Data interfacing platform 102 is configured to facilitate generating a graphical user interface (GUI) that includes a data object representing a set of content items such as a media playlist (e.g., a music playlist or a video playlist), video channel, collection of articles, collection of contacts, etc. In an aspect, the data object can include a unique thumbnail that distinguishes the set of media items amongst other thumbnails provided in the user interface that represent single content items. The unique thumbnail can present users with a snapshot image representing the set of content items as a whole and dynamic images that represent individual content items included in the set. As used herein, a thumbnail refers to a graphical icon or object that represents a content item or set of content items (e.g., playlist or channel). A thumbnail can include static images and/or moving images. In an aspect, a thumbnail can include a video or an animation.

Data interfacing platform 102 can be employed by various systems and devices to facilitate presenting and organizing media items. By way of example, FIG. 1 presents data interfacing platform 102 for use in conjunction with media provider 116 accessible to client device 120 via a network. In this respect, system 100 includes client device 120, media provider 116, data interfacing platform 102 and one or more networks 118 for connecting client device 120, media provider 116, and/or data interfacing platform 102. Although data interfacing platform 102 is depicted separated from media provider 116 and client device 120, one or more components of data interfacing platform 102 can be provided at client device 120 and/or media provider 116. For example, client device 120 can include data interfacing platform 102 and access media provider 116 via a network. In another aspect, media provider 116 can include data interfacing platform 102.

Media provider 116 can include an entity configured to provide media items, such as streaming video, streaming music, and/or streaming television to client device 120 via a network 118. In an aspect, data interfacing platform 102 can facilitate generating a GUI (e.g., can configure the GUI and/or generate the GUI) at client device 120 that facilitates organizing, presenting, and consuming media items provided by media provider 116 at client device 120.

For example, media provider 116 can provide and/or present media content to client device 120 via a website platform that can be accessed using a browser of the client device 120. The media content can be presented to a user of client device 120 via a GUI generated/configured by data interfacing platform 102 and rendered at client device 120 using the browser of the client device 120. In an aspect, media provider 116 can employ one or more server computing devices to store and deliver streaming media content to users via a network 118. The media can be stored in memory associated with media provider 116 and/or at various servers employed by media provider 116 and accessed via client device 120 using a website platform of the media provider 116. For instance, media provider 116 can include a media presentation source that has access to a voluminous quantity (and potentially an inexhaustible number) of shared media (e.g., video and/or audio) files. Media provider 116 can further stream these media files to client device 120 via a network 118 in accordance with a video playing/streaming session initiated by a user of the client device 120.

As used herein the term content or content item can include a data object that can be represented by an image. A content item can include a text document and/or a multimedia file. For example, a content item can include an article, a message, a contact book entry, a webpage, a video, a song, an image, etc. The term content item encompasses media items, including but is not limited to, streamable media (e.g., video, live video, streaming video, video advertisements, music, music videos, sound files and etc.) and static media (e.g., pictures, thumbnails). In an aspect, the term media content or media item can include a collection of media items such as a playlist including several videos or songs, or a channel including several videos or songs associated with a single media creator. As used herein, a playlist refers to a set of two or more media items (e.g., videos, songs, still images). In an aspect, media items included in a playlist are configured to play in a sequential manner.

A channel refers to data content that is available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Client device 120 can include any suitable computing device configured to interact with data interfacing platform 102 and/or a media provider 116 and configured to display an interface generated by data interfacing platform 102. For example, client device 120 can include a desktop computer, a laptop computer, a mobile phone, a smartphone, a tablet personal computer (PC), a personal digital assistant PDA, or a television. As used in this disclosure, the terms "content consumer" or "user" refer to a person, entity, system, or combination thereof that employs system 100 (or additional systems described in this disclosure) using client device 120. Network(s) 118 can include wired and wireless networks, including but not limited to, a cellular network, a wide area network (WAD, e.g., the Internet), a local area network (LAN), or a personal area network (PAN). For example, client device 120 can communicate with media provider 116 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Client device 120 can include presentation component 122 to present a GUI (or virtual user interface) that includes at least a unique thumbnail representing a media playlist as configured and/or generated by data interfacing platform 102 in accordance with various aspects and embodiments described herein. In an aspect, the GUI can organize and present media items available for streaming by media provider 116 via a network 1118. For example, the GUI can facilitate requesting and playing videos and videos playlists associated with media provider 116 at client device 120. According to this aspect, presentation component 122 can include an application (e.g., a web browser) for retrieving, presenting and traversing information resources on the World Wide Web in association with generating and/or presenting a GUI configured by data interfacing platform 102. In another aspect, presentation component 122 can present a GUI configured and/or generated by data interfacing platform 102 that facilitates consuming local media content provided at client device 120.

Presentation component 122 can present media viewing options for use with any suitable type of device configured to display a GUI and receive and play streamed media from media provider 116, including but not limited to: a mobile phone, a tablet computer, a desktop computer, a server system, a personal computer, a cable set top box, a satellite set top box, a cable modem, a television set, an Internet-enabled television, a television computer device media extender device, a video cassette recorder device, a blu-ray device, DVD(digital versatile disc or digital video disc) device, a compact disc device, a video game system, an audio/video receiver, a radio device, a portable music player, a navigation system, a car stereo, etc.

The respective devices listed above (and additional devices suitable for interfacing with a streaming media provider) often have different capabilities and limitations (e.g., screen size, decoders . . . ). In an aspect, presentation component 122 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 304 can generate user options to account for variations in device functionality and available bandwidth for consumption and rendering of media content.

In view of the above, presentation component 122 can present content in various formats and/or in accordance with various display mediums. In particular, presentation component 122 can adapt and optimize display of options and content based on respective client devices. For example, presentation component 122 can adapt the manner in which a thumbnail representing a video playlist is presented to a user based on client device 120 capabilities and display restrictions. In another example, presentation component 122 can present a section of video in a format such as H.263, H.264 AVC, MPEG-4 SP, VP8, or other suitable format based on the client device 120. In yet another example, presentation component 122 can present an audio of a video in formats such as for example AAC LC/LTP, HE-AACv1 (AAC+), HE-AACv2 (enhanced AAC+), AMR-NB, AMR-WB, FLAC, MP3, MIDI, Vorbis, PCM/WAVE, etc.

In an aspect, presentation component 122 can automatically configure or present user options to consume video based on encoding parameters such as video resolution, video frame rate, video bit rate, video codec, audio codec, audio channels, audio bit rate, etc. Thus presentation component 122 can choose a format to consume content that best suits capabilities of specific consumption mediums, available bandwidth, file size, processing capabilities, screen resolution, screen size, available encoders, available decoders, etc.

Data interfacing platform 102 can include interface component 104 to configure and/or generate a GUI for presentation at client device 120 that includes at least a unique and dynamic thumbnail representing a set of content items. For example, the set of media items can include a set of videos grouped together in a media playlist, a set of videos associated with a channel, a collection of images associated with a slideshow, a set of messages or articles associated with an author, a set of contact entries associated with a group of friends, etc. The dynamic thumbnail can include features and/or functionality that distinguishes the content represented by the thumbnail as a set of content items as opposed to an individual content item (e.g., a single video, an single song, a single image, etc.).

In an aspect, a dynamic thumbnail can include a static portion that includes a first image associated with a set of content items represented by the thumbnail. For example, the static portion can include a first image representative of a first video included in a video playlist or a general image representing the video playlist, where the dynamic thumbnail represents a video playlist. In another example, where the set of content items represents contact information for players of a baseball team, the first image can include a team photo. The dynamic thumbnail can further include a dynamic portion that includes one or more other images associated with the set of content items. For example, where the set of content items is a video playlist, the dynamic portion can include one or more other images respectively representing other videos in the playlist. In another example, where the set of content items represents the contact information for players of the baseball team, the dynamic portion can include one or more other images respectively representing individual players of the baseball team.

The dynamic portion is configured to change while image(s) provided in the static portion remain the same in response to various triggers associated with user interaction with an interface including the dynamic thumbnail and/or in response to passage of time. For example, the dynamic portion can be configured to present different images associated with the set of content items in response to movement of the thumbnail as a result of a shift in the GUI including the thumbnail with respect to the dimensions of the display screen area of a client device 120 in which the GUI is presented (e.g., in response to scrolling up or down a page of the GUI that includes the thumbnail). According to this example, an image provided in the dynamic portion can be replaced with another image associated with the set of content items represented by the thumbnail in response to movement of the thumbnail. In another aspect, the dynamic portion of a thumbnail can include a fixed window in which images associated with the set of content items represented by the thumbnail scroll across (e.g., moving up, down, left or right) in response to movement of the thumbnail. In another example, the dynamic portion can present different images associated with the set of content items over the course of time. According to this example, a new image can be displayed in the dynamic portion every X seconds, where X is a number.

Interface component 104 can include thumbnail generation component 106 to configure and/or generate a dynamic thumbnail in accordance with aspects and embodiments described herein. Interface component 104 can also include thumbnail adaptation component 108 to facilitate adapting the dynamic portion of a dynamic thumbnail in accordance with aspects and embodiments described herein.

Figure 2:
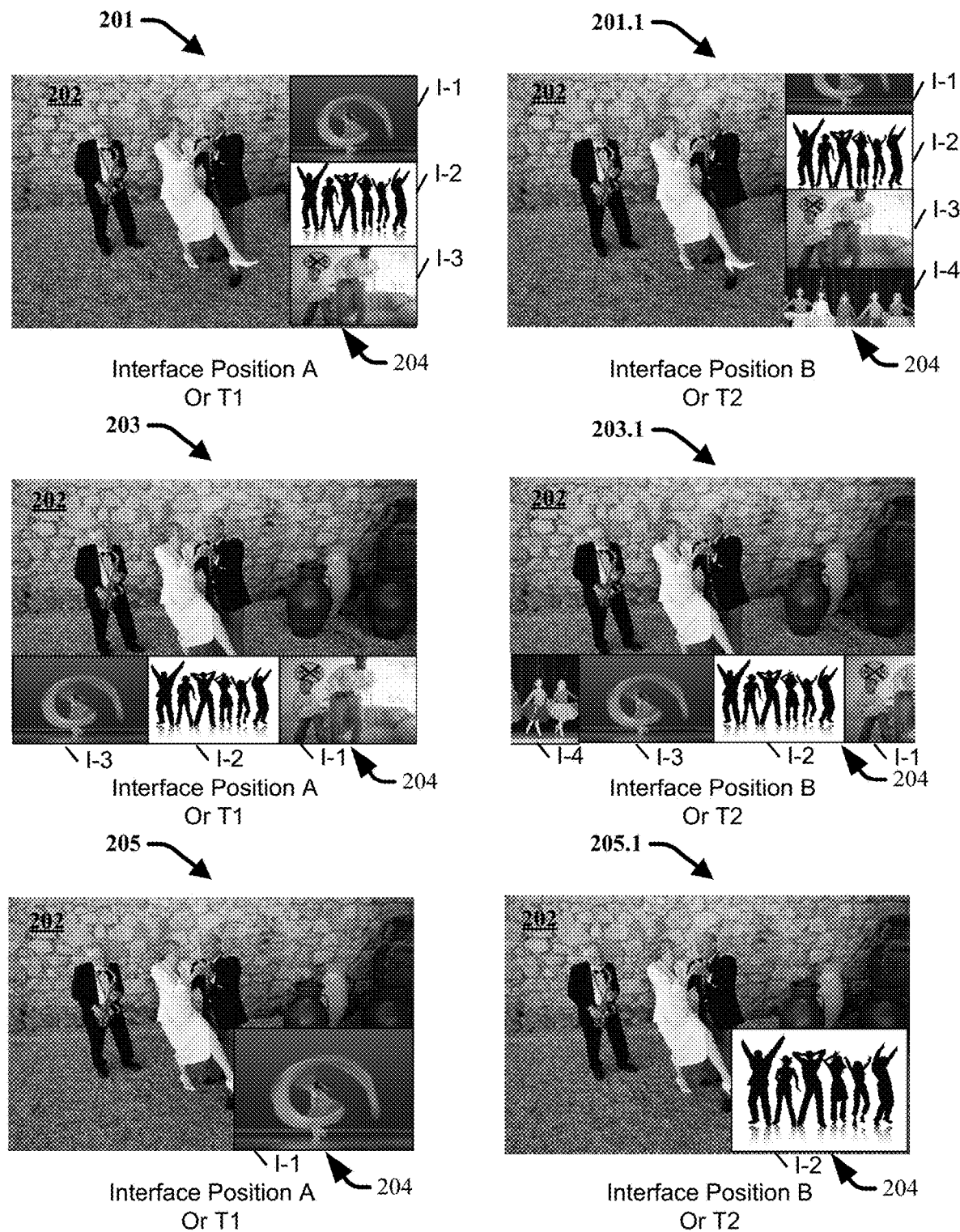
FIG. 2 presents examples dynamic thumbnails representative of a set of media items associated with a playlist in accordance with various aspects and embodiments described herein.

FIG. 2 presents example embodiments of dynamic thumbnails 201-205.1 representative of a video playlist. In an aspect, thumbnails 201-205.1 are included in a GUI that organizes and presents various media items available for streaming by media provider 116. It should be appreciated that dynamic thumbnails 201-205.1 are depicted isolated from the GUI in which they are included merely to exemplify various unique features of the respective thumbnails. Repetitive description of like elements employed in respective embodiments of systems and interfaces described herein are omitted for sake of brevity.

Dynamic thumbnails 201, 203 and 205 depict different embodiments of thumbnails generated/configured by thumbnail generation component 106. Dynamic thumbnails 201.1, 203.1, and 205.1 represent dynamic thumbnails 201, 203 and 205, respectively, as modified by thumbnail adaptation component 108 in response to movement of the respective thumbnails about a GUI in which the respective thumbnails are provided (e.g., in response to scrolling up or down of a hypertext markup language (HTML) page including the respective thumbnails) and/or in response to passage of time. Each of the respective thumbnails 201-205.1 include a static portion 202 and a dynamic portion 204. The static portion 202 and the dynamic portion have a fixed area and are configured to present images associated with respective images of the video playlist represented by the respective thumbnails. The image included in the static portion 202 is configured to remain constant or fixed as the images included in the dynamic portion are configured to change. In an aspect, each of the images provided in the dynamic portion represent a different video in the video playlist represented by the thumbnail. The video playlist can include any number N videos, where N is an integer.

Dynamic thumbnail 201 has a dynamic portion 204 that includes a vertical column of images located to the right of an image included in the static portion 202. For example, the dynamic portion 204 of thumbnail 201 is shown with three images, I-1, I-2, and I-3 located in a vertical column. Each of the three images I-1, I-2, and I-3 can represent a different video of the video playlist represented by dynamic thumbnail 201. Dynamic thumbnail 201 is associated with an interface position A or time T1.

Dynamic thumbnail 201.1 depicts a version of dynamic thumbnail 201 in response to movement of the thumbnail from position A to position B about a user interface and/or in response to passage of time from T1 to T2. As seen in dynamic thumbnail 201.1, as the thumbnail moves or as time passes, images included in the dynamic portion also move to reveal additional images associated with additional videos of the video playlist. However, the image provided within the static portion 202 can remain fixed. For example, images I-1, I-2 and I-3 can scroll upward within the constraints of the dimensions of dynamic portion 204 until they are no longer visible within the window of the dynamic portion. As the images I-1, I-2, and I-3 scroll upward, new images representative of additional videos in the playlist can appear within the window of the dynamic portion. For example, image I-4 become visible within the window of the dynamic portion 204 as image I-4 moves out of the window.

Dynamic thumbnail 203 is similar to dynamic thumbnail 201 aside from a modification to the position and configuration of the dynamic portion 204. In dynamic thumbnail 203, the dynamic portion includes a horizontal row of images located below the static portion 202. Dynamic thumbnail 203 is associated with an interface position A or time T1. Dynamic thumbnail 203.1 depicts a version of dynamic thumbnail 203 in response to movement of the thumbnail from position A to position B about a user interface and/or in response to passage of time from T1 to T2. As seen in dynamic thumbnail 203.1, as the thumbnail moves or as time passes, images included in the dynamic portion also move to reveal additional images associated with additional videos of the video playlist. However, the image provided within the static portion 202 can remain fixed. For example, images I-1, I-2 and I-3 can scroll across the dynamic portion 204 within the dimensions of the window of the dynamic portion 204 until they are no longer visible. As the images I-1, I-2, and I-3 scroll to the right, new images representative of additional videos in the playlist can appear within the window of the dynamic portion. For example, image I-4 become visible within the window of the dynamic portion 204 as image I-4 moves out of the window.

It should be appreciated that different images associated with respective videos included in the playlist represented by thumbnails 201-203.1 can move in a sequential scrolling fashion within the window of dynamic portion 204 as the respective thumbnails continue to move about the user interface (e.g., to interface position C, D, E, etc.) and/or as time passes.

Dynamic thumbnail 205 represents yet another embodiment of a dynamic in accordance with various aspects disclosed herein. The dynamic portion 204 of thumbnail 205 includes a single image representative of a video included in the playlist represented by the thumbnail. Dynamic thumbnail 205.1 depicts a version of dynamic thumbnail 205 in response to movement of the thumbnail from position A to position B about a user interface and/or in response to passage of time from T1 to T2. As seen in dynamic thumbnail 205.1, as the thumbnail moves or as time passes, the image included in the dynamic portion 204 changes to present another image (e.g., from I-1 to I-2) representative of another video included in the video playlist represented by the thumbnail. The degree or amount of movement and/or amount of time associated with replacement of an image included in dynamic portion can vary.

With reference back to FIG. 1, it should be appreciated that the size, configuration, and number of images included in a static portion and dynamic portion of a dynamic thumbnail can vary and is not limited to the examples depicted herein. In addition, the manner in which one more images included in the dynamic portion change (e.g., replacement of an image with a new image or scrolling of images across the window of the dynamic portion) and the reason for the change (e.g., movement of the thumbnail or passage of time) can also vary and are not limited to the example provided herein.

As exemplified with respect to FIG. 2, in an aspect, one or more images provided in a dynamic portion of a dynamic thumbnail can move in a scrolling manner within the dimensions of the dynamic portion in response to movement of the dynamic thumbnail. For example, this movement of the dynamic thumbnail can be a function of a shift in a GUI in which the dynamic thumbnail is provided (e.g., a webpage). In an aspect, the shift can be a function of scrolling of a page of the GUI (e.g., scrolling up or down or left or right) in which the dynamic thumbnail is provided, movement of a window or tab of the GUI including the dynamic thumbnail, or resizing of the window or tab.

In an aspect, the rate at which images associated with a set of content items change or scroll across the dimensions of the dynamic portion can correlate to a degree and/or speed of movement associated with the thumbnail. For example, in order to create a parallax effect, the rate at which images associated with a set of content items scroll across the window of the dynamic portion can be slower that a rate or speed at which the thumbnail moves about the GUI in which the thumbnail is provided. For instance, when the thumbnail moves up or down a page of a GUI in response to scrolling of the page up or down, the rate at which images scroll across the dynamic portion of the thumbnail can be slower than the scrolling rate of the page. In yet another example, the rate at which images associated with a set of content items scroll across the dimensions of the dynamic portion can be faster that a rate or speed at which the thumbnail moves about the GUI in which the thumbnail is provided.

In an aspect, thumbnail generation component 106 can facilitate user selection of images to associate with a dynamic thumbnail. For example, thumbnail generation component 106 can allow a user to select the image to include in the static portion of a dynamic thumbnail and the one or more images to initially display in the dynamic portion. According to this example, a user can select an image from any content item included in the set of content items to be displayed in the static portion of the dynamic thumbnail. The user can also select images from any of the other content items included in the set of content items to for initial display in the dynamic portion. For example, a user can select images for his top three favorite videos in a playlist for initial display in the dynamic portion of a dynamic thumbnail representative of the playlist. In another example, a user can select images associated with media items of the playlist that the user finds most eye catching for initial display in the dynamic portion. In another example, thumbnail generation component 106 can facilitate user selection of the order in which images associated with content items included in a set of content items, will appear in the dynamic portion as the dynamic portion changes (e.g., in response to the various triggers discussed herein).

Thumbnail generation component 106 can also facilitate user selection of a subset of images associated with a set of content items for display in the dynamic portion of a dynamic thumbnail representative of the set of content items. For instance a set of content items can include more content items, and images respectively representative of the content items, that can possibly be displayed in the dynamic portion based on the manner in which the dynamic portion is configured to adapt. For example, where the dynamic portion of a thumbnail is configured to present about three images at a time in a scrolling manner in response to movement of the thumbnail about the user interface (e.g., as described with respect to dynamic thumbnails 202 and 202.1 of FIG. 2), depending on the dimensions of the user interface/display screen and the speed at which the images are configured to scroll across the dynamic portion, the number of images that can possibly scroll through the dynamic portion is limited. Accordingly, thumbnail generation component 106 can inform a user of a range of the number of images that could possibly be presented in the dynamic portion. Where the range of the number of images is less than the number of images associated with the set of content items represented by the thumbnail, the user can select a subset of the images for inclusion in the dynamic portion.

In another aspect, thumbnail generation component 106 can be configured to automatically select images to include in a dynamic thumbnail for a set of content items (e.g., a playlist or channel). For example, thumbnail generation component 106 can apply an image selection mechanism wherein the image selected for the static portion of the dynamic thumbnail is an image representative of a first song or video of a playlist. Thumbnail generation component 106 can then select the one or more images for initial display in the dynamic portion of the thumbnail that correspond to the one or more images representative of the one or more songs or videos sequentially following the first song or video of the playlist. In another example, thumbnail generation component 106 can select two or more images representative of content items in a set of content items and generate a mash-up or collage of the one or more images to include in the static portion. According to this example, thumbnail generation component 106 can randomly select content items from which to select images to include in the collage, or apply various algorithms that predicatively determine which images to include (e.g., apply the first X images associated with the first X songs of the playlist, apply the first, last and media images respectively associated with the first, last and median songs of the playlist, etc.).

In another aspect, thumbnail generation component 106 can apply various analytical techniques that facilitate selection of images to include in a dynamic thumbnail that accomplish different agendas, such as capturing user's attention, eliminating offensive content, or tailoring of the thumbnail to particular audience. For example, thumbnail generation component 106 can analyze content items respectively included in a set of content items based on one or more of the following factors: user preferences, user demographics, user location, user context, user social affiliation, currency (e.g., newness) of the respective content items, or popularity of the respective content items (e.g., as a function of viewing/listing history amongst a plurality of user, as a function of social media publicity, etc.). Based on this analysis, thumbnail generation component 106 can identify content items included in the set from which to use images, respectively represented of the respective content items, to display in the static portion of a dynamic thumbnail, the dynamic portion and/or the order in which those images are displayed in the dynamic portion. For example, where a playlist includes music videos for a plurality of pop songs, thumbnail generation component 106 can identify a video for a pop song included in the playlist which is currently the most popular among users in a same demographic as a user to whom the thumbnail for playlist will be presented. The thumbnail generation component 106 can then employ that image for the static portion of the thumbnail. Similarly, images representative of other songs in the playlist can be selected for display in the dynamic portion in an order based on popularity of the respective songs.

In addition, thumbnail generation component 106 can analyze images respectively representative of content items included in a set of content items for which to generate a dynamic thumbnail based on various factors related to image content and image properties to facilitate selecting which image(s) to include in the static and dynamic portions of a thumbnail (and the order in which selected images will appear in the dynamic portion when adapted). For example, thumbnail generation component 106 can employ image analysis techniques to identify content characteristics the images (e.g., identify faces, body parts, clothing or lack thereof, animals, blood, weapons, etc.). Thumbnail generation component 106 can also analyze image quality, image brightness, image contrast, color variation, and etc. to facilitate determining which images to display in the static and dynamic portions of the thumbnail and the order in which selected images will appear in the dynamic portion. For example, based on analysis of various image properties, thumbnail generation component can identify images that are likely capture users attention. According to this aspect, thumbnail generation component 106 can select images that contrast in image properties to display next to one another and/or following one another so that the respective images can be easily distinguished and capture user's attention. For example, thumbnail generation component 106 can place a colorful image after a black and white image within the dynamic portion so that the respective images can stand.

In an aspect, thumbnail adaptation component 108 can be configured to change one or more images provided in the dynamic portion of a dynamic thumbnail in response to other factors in addition to thumbnail movement or massage of time. For example, any user interaction associated with a user interface in which a dynamic thumbnail is provided can cause an image included in the dynamic portion of the thumbnail to change. According to this example, user interaction such as movement of a cursor about the user interface, hovering and/or moving of a stylus or finger over a user interface (e.g., without touching the display screen presenting the user interface), selection of objects within the user interface, or input of data into the user interface can cause thumbnail adaptation component 108 to adapt images included in the dynamic portion. Additional features and functionalities of the user interfaces that data interfacing platform 102 facilitates generating for presentation by client device 120 are discussed in greater detail with respect to FIGS. 3-9.

Thumbnail adaptation component 108 can also be configured to adapt a dynamic thumbnail and/or an aspects of an interface in which a dynamic thumbnail is provided in other manners aside from changing images (e.g., via replacement or scrolling) included in the dynamic portion. In an aspect, thumbnail adaptation component 108 can cause properties of the image data included a dynamic thumbnail to change in response to various triggers discussed herein (e.g., thumbnail movement, time, and other types of user interaction with the user interface including the dynamic thumbnail). For example, thumbnail adaptation component can cause images of the dynamic thumbnail to change in brightness or contrast to accomplish a flashing effect associated with the thumbnail as the thumbnail moves about an interface. In another example, thumbnail adaptation component 108 can cause other thumbnails displayed in a user interface to become opaque while leaving a dynamic thumbnail bright and clear (and vice versa) as it moves about a user interface.

In another aspect, thumbnail adaptation component can adapt properties and/or the dynamic portion of a thumbnail base on a manner in which a user interacts with the thumbnail. For example, as a user moves a cursor over, finger over (e.g., in a hovering manner or touching manner), or other object over a dynamic thumbnail, thumbnail adaptation component can cause images in the dynamic portion to scroll at a faster or slower rate than a scrolling rate when the user does not move a cursor or finger over the thumbnail. In another aspect, in response to interaction with a dynamic thumbnail in the manners noted above (e.g., by moving a cursor or finger over the thumbnail, thumbnail adaptation component 108 can enlarge the size of the dynamic thumbnail (e.g., in an enlarged window overlaid on top of other objects or thumbnails displayed in the interface). In association with this aspect, thumbnail adaptation component 108 can increase the dimensions of the dynamic portion of the thumbnail and the number of images displayed within the dynamic portion of the thumbnail (e.g., from 3 images to 10 images). In another aspect, in response to interaction with a dynamic thumbnail, thumbnail adaptation component 108 can generate a drop down window associated with the dynamic portion of the thumbnail in which more images associated with the set of images represented by the thumbnail are displayed. For example, thumbnail adaptation component 108 can generate a drop down window tangential from the dynamic portion of the thumbnail. The drop down window can create an extension to the dynamic portion of the thumbnail and display additional images associated with content items included in the set of content items represented by the thumbnail.

In an aspect, thumbnail adaptation component can include mode component 124 to facilitate setting a dynamic thumbnail into different adaptation modes. For example, mode component 124 can allow a user to select the manner in which a dynamic thumbnail can adapt, including the number of images to display in the dynamic portion at a time, a scrolling speed of the dynamic portion, and dimensions of the dynamic portion and static portion. Mode component 124 can also be employed by thumbnail adaptation component 108 to automatically adjust the manner and degree to which a dynamic thumbnail adapts. For example, mode component 124 can adjust the manner and degree to which a dynamic thumbnail adapts based on dimensions of a user interface/display screen in which the dynamic thumbnail is displayed. In an aspect, mode component 124 can set the dynamic portion of a thumbnail to static mode, and/or allow a user to set the dynamic portion of the thumbnail to static mode. According to this aspect, when the dynamic portion of a thumbnail is set to static mode, the one or more images provided in the dynamic mode stop changing in response to the various triggers discussed herein and remain in a static state along with the image included in the static portion of the dynamic thumbnail.

Interface component 104 can include inference component 126 to provide for or aid in various inferences or determinations associated with aspects of data interfacing platform. In an aspect, all or portions of data interfacing platform 102 can be operatively coupled to inference component 126. Moreover, inference component 126 can be granted access to all or portions of media provider 116, client device 120, and other sources accessible via network 118.

In an aspect, thumbnail generation component 106 can employ inference component 106 to facilitate inferring which images associated with a set of content items to include in the static and dynamic portions of a dynamic thumbnail to represent the set of content items. For example, inference component 126 can infer which videos included in a set of videos are associated with images that are best representative of the set images and/or which images that are more attention grabbing than others. In another example, inference component 126 can infer which content items are most likely to entice a particular user (e.g., based on preferences and/or demographics of the user and popularity of the respective content items) and identify images respectively representing the most enticing content items in the set. Thumbnail generation component 106 can then use those images identified by inference component 126 in the static portion of the thumbnail and in the dynamic portion of the thumbnail when initially displayed to a user. In another aspect, thumbnail adaptation component 108 can employ inference component 126 to infer a manner in which to adapt a dynamic portion of a thumbnail.

In order to provide for or aid in the numerous inferences described herein, inference component 126 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Input component 110 can facilitate user interaction with a GUI configured or generated by interface component 104 and presented at a client device via presentation component 122. Input component 110 can receive and interpret virtually any user command associated with interacting with a GUI presented at client device 120. For example, input component 110 can receive commands that effectuate a shift in a GUI including a dynamic thumbnail, such as commands to scroll up and down the GUI, minimize a window of the GUI, move a window of the GUI, resize a window of the GUI, etc. In an aspect, input component 110 is included or otherwise accessible to client device 120. In an aspect, thumbnail adaptation component 108 is configured to change one or more images (e.g., via replacement or scrolling) included in a dynamic portion of a dynamic thumbnail in response to input commands received by input component 110 the result in movement of the dynamic thumbnail with respect to the dimensions of a display screen area of client device 120 in which a GUI including the dynamic thumbnail is provided.

Input component 110 can be configured to receive and interpret input commands from various input devices. For example, input component 110 can receive commands from an input device (e.g., a controller, a keyboard, a mouse, a touch screen, voice recognition input device, a gesture recognition input device, etc., (not shown)), and interpret those commands to facilitate interaction with a graphical input display generated by interface component 104. In an aspect, the input device includes a basic controller having up/down/left/right and select buttons, such as for example a television remote. In another aspect, the input device can include a touch screen, a keyboard, a mouse, a stylus, etc. In another aspect, input component 110 can receive and interpret gesture commands. Gesture commands can include commands based on body movement that have been correlated to a particular input/reaction at a user interface. In particular, input component 110 can interpret gestures such as certain hand signals, finger signals, arm signals, and other body movement signals, directed towards a display screen or hologram at which an interface is displayed as input commands to move a scroll box/cursor about the interface and to select items on the interface.

In another aspect, input component 110 is configured to track and interpret user voice commands declaring how to interact with and navigate a user interface generated by data interfacing platform. According to this aspect, the client device 120 at which the interface is displayed or generated, or another device in communication with data interfacing platform 102, can include a microphone for receiving speech commands. The device including the microphone can then send the audio speech commands to input component 110 for interpretation and effectuation. In an aspect, the device including the microphone can include speech analysis software for analyzing speech (e.g., converting speech to text) and providing the analyzed speech to the input component 110. In another aspect, the input component 110 can include such speech analysis software.

FIGS. 3-9 present various graphical user interfaces capable of being generated or configured by data interfacing platform 102 in accordance with various aspects and embodiments disclosed herein. The following graphical user interfaces exemplify aspects of dynamic thumbnails in association with representation of a video playlist or channel. However, it should be appreciated that dynamic thumbnails, as described herein, can be used to represent various collections or sets of content items, such as a set of articles, a set of books, a set of chapter included in a book, a set of contacts included in a contact list, etc. Repetitive description of like elements employed in respective embodiments of systems and interfaces described herein are omitted for sake of brevity.

Figure 3:
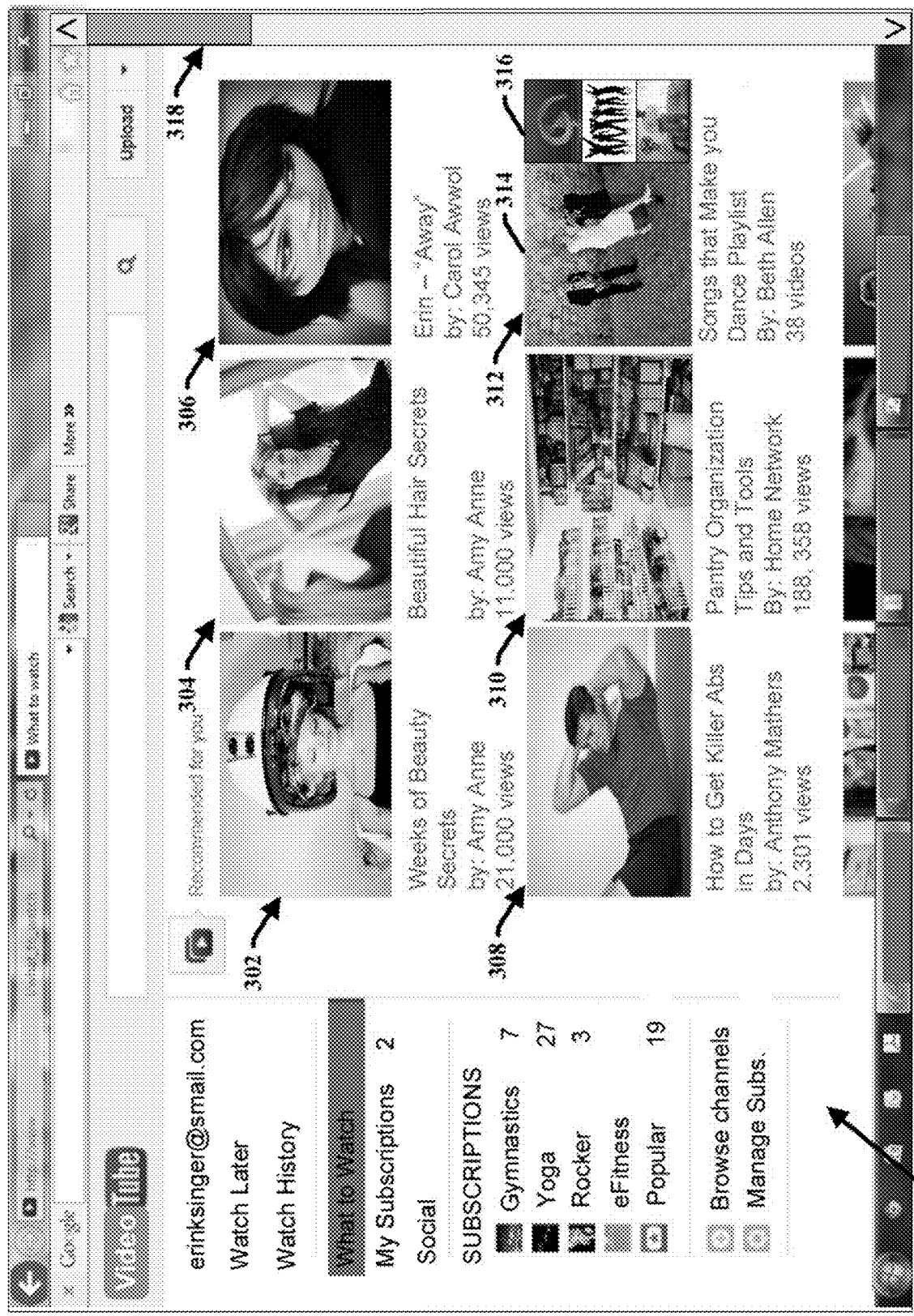
FIG. 3 illustrates a schematic representation of an example layout of a graphical interface that includes a dynamic playlist thumbnail in accordance with various aspects and embodiments described herein.

FIG. 3 presents an example interface 300 displaying a webpage that organizes and presents media items available for streaming by a networked media provider (e.g., media provider 116). In an aspect, the webpage is displayed on a display screen of a standard sized PC or tablet computer. The webpage can include various features and menu options that facilitate navigating and viewing media items. Such features can vary and are immaterial to the novel aspects of the subject disclosure.

Interface 300 includes a plurality of media items 302-312 recommended for viewing. Each of the media items are represented by a thumbnail. Media items 302-310 are single videos. Media item 312 however is a video playlist entitled "Songs that make you dance" and includes a set of music videos. The thumbnail for media item 312 is noticeably different compared to the thumbnails for media items 302-310. In particular, the thumbnail representing the playlist is a dynamic thumbnail having a static portion 314 and a dynamic portion 316. The dynamic portion 316 includes three different images respectively representing videos included in the playlist. In an aspect, as a user interacts with interface 300 and move scrollbar 318 down to view additional content of the webpage, the images included in the dynamic portion 316 can change while the image included in the static portion 314 remains the same. For example, the images included in the dynamic portion 316 can be replaced with new images respectively representing additional videos included in the playlist.

Figure 4:
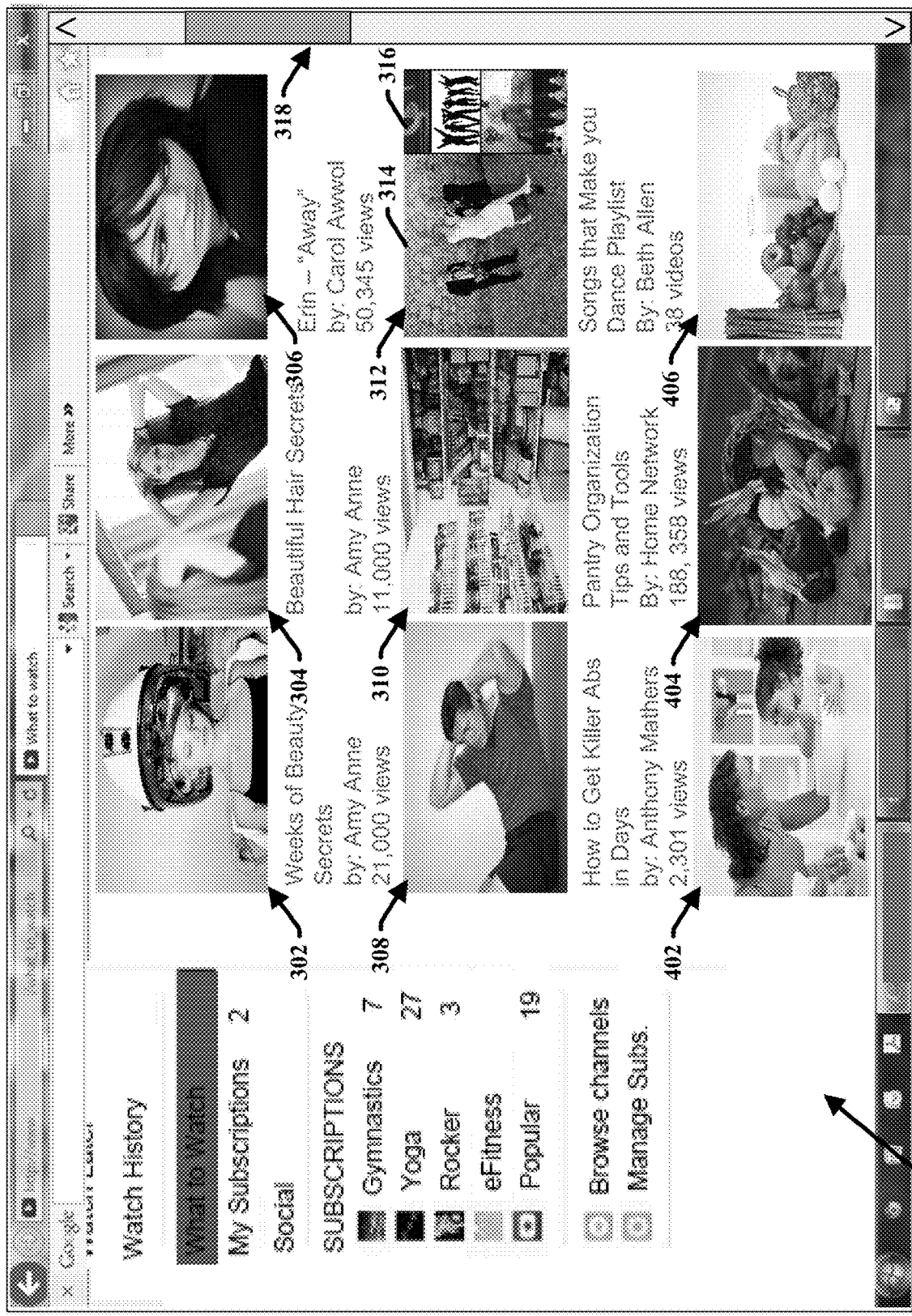
FIG. 4 illustrates a schematic representation of another example layout of a graphical interface that includes a dynamic playlist thumbnail in accordance with various aspects and embodiments described herein.

FIG. 4 presents an example interface 400 displaying the webpage of FIG. 3 in response to movement of scrollbar 318 downward. In interface 300, the webpage has shifted to reveal additional recommended media items 402-404 in response to scrolling using scrollbar 318. As the webpage shifts downward the dynamic thumbnail representing playlist media item 312 shifts upward. This movement of the thumbnail causes the images included in the dynamic portion to scroll upward within the fixed dimensions of the dynamic portion 316. For example, the dynamic portion now includes two partial images and two full images. In another aspect, (not shown) as the contents of the webpage shift upward, the images included in the dynamic portion can scroll downward within the fixed dimensions of the dynamic portion.

Figure 5:
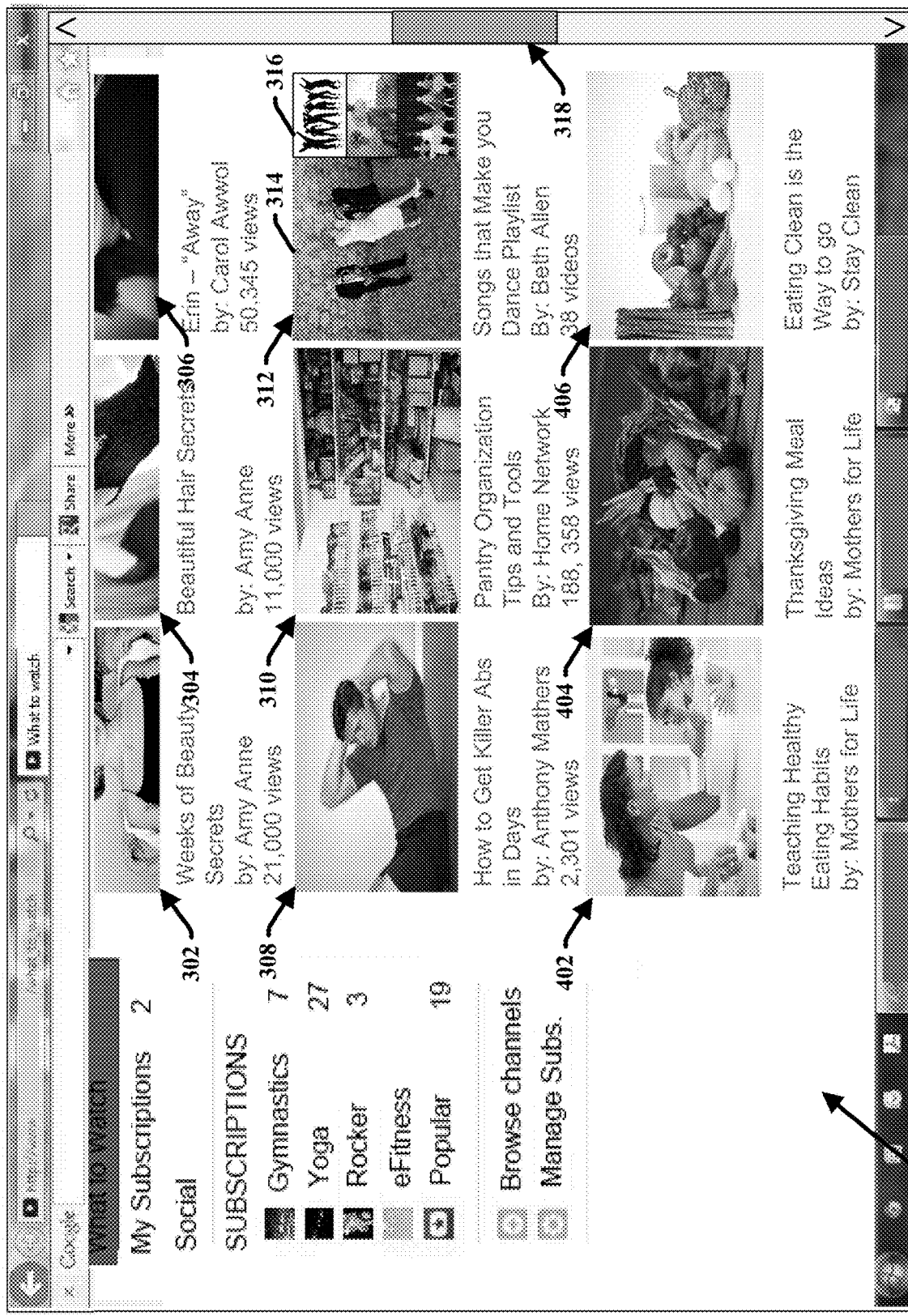
FIG. 5 illustrates a schematic representation of another example layout of a graphical interface that includes a dynamic playlist thumbnail in accordance with various aspects and embodiments described herein.

FIG. 5 presents an example interface 500 displaying the webpage of FIG. 4 in response to additional movement of scrollbar 318 downward. In interface 400, the webpage has shifted again in response to scrolling using scrollbar 318. As the webpage shifts downward the dynamic thumbnail for the playlist media item 312 shifts upward. This movement of the thumbnail causes the images included in the dynamic portion to continue to scroll upward within the fixed dimensions of the dynamic portion 316. For example, the dynamic portion now includes three full images, similar to the dynamic portion of the thumbnail as displayed in interface 300. However, the sets of images included in the dynamic portions of the playlist thumbnail displayed in interfaces 300, 400 and 500, respectively, are different.

Figure 6:
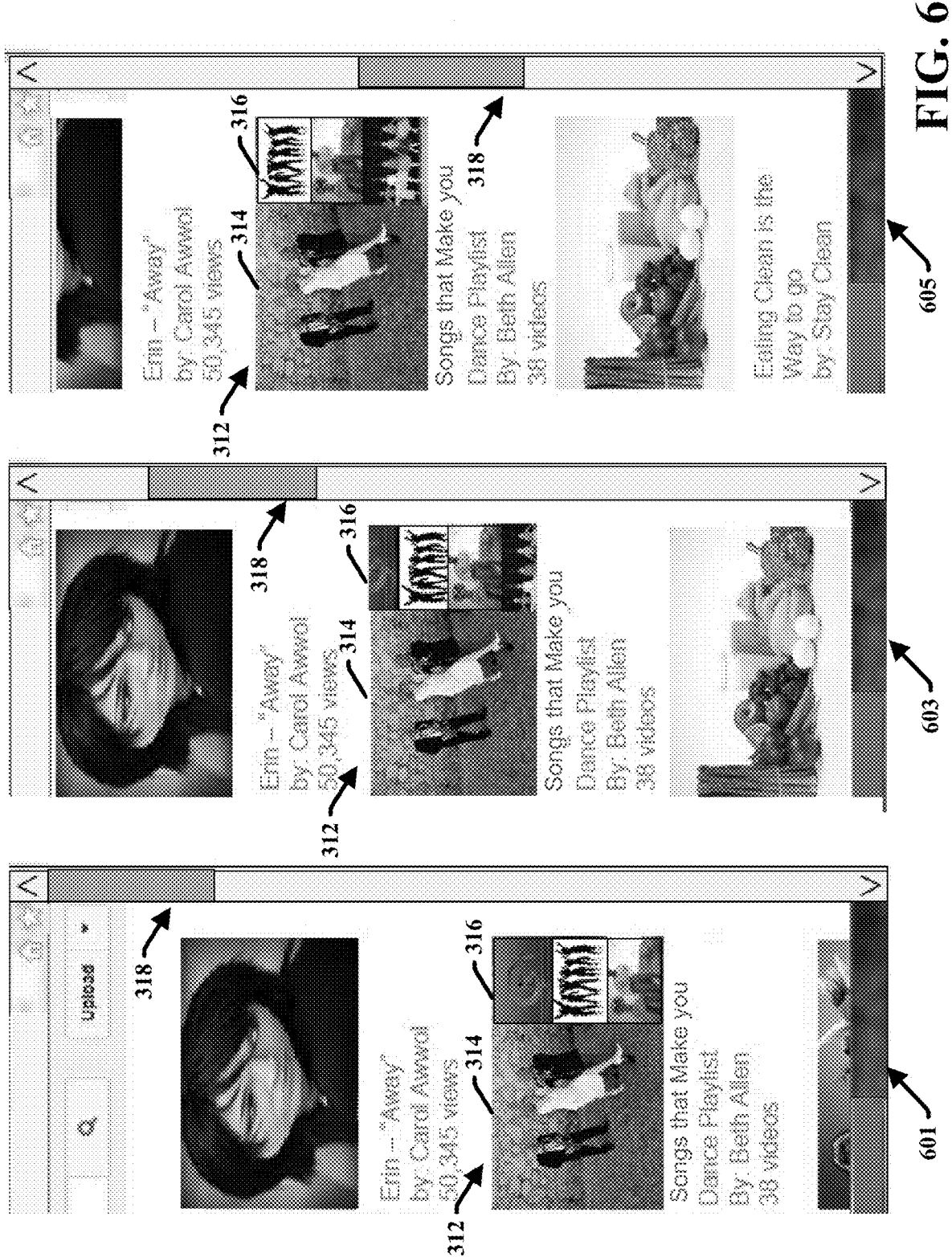
FIG. 6 illustrates enlarged portions of graphical interfaces that include a dynamic playlist thumbnail in association with scrolling of the respective graphical interfaces in accordance with various aspects and embodiments described herein.

FIG. 6 presents enlarged aspects of interfaces 300, 400 and 500 to better exemplify the dynamic aspects of the dynamic thumbnail for playlist media item 312. Item 601 corresponds to an enlarged portion of interface 300. Item 603 corresponds to an enlarged portion of interface 400 and item 605 corresponds to an enlarged portion of interface 500. Viewing the respective portions of interfaces 300, 400 and 500 side by side, it can be seen that as the dynamic thumbnail changes position within the respective interfaces in response to downward scrolling of scrollbar 318, the images included in the dynamic portion 316 simultaneously scroll across the dimensions of the dynamic portion 316 in a fluid motion. The rate at which the images scroll across the dynamic portion 316 is a function of a rate of movement of the dynamic thumbnail as a whole. In an aspect, the rate at which the images scroll across the dynamic portion 316 is slower than a rate at which the entire interface (and dynamic thumbnail) shifts in response to the scrolling. In another aspect, the rate at which the images scroll across the dynamic portion 316 is faster than a rate at which the entire interface (and dynamic thumbnail) shifts in response to the scrolling.

Figure 7:
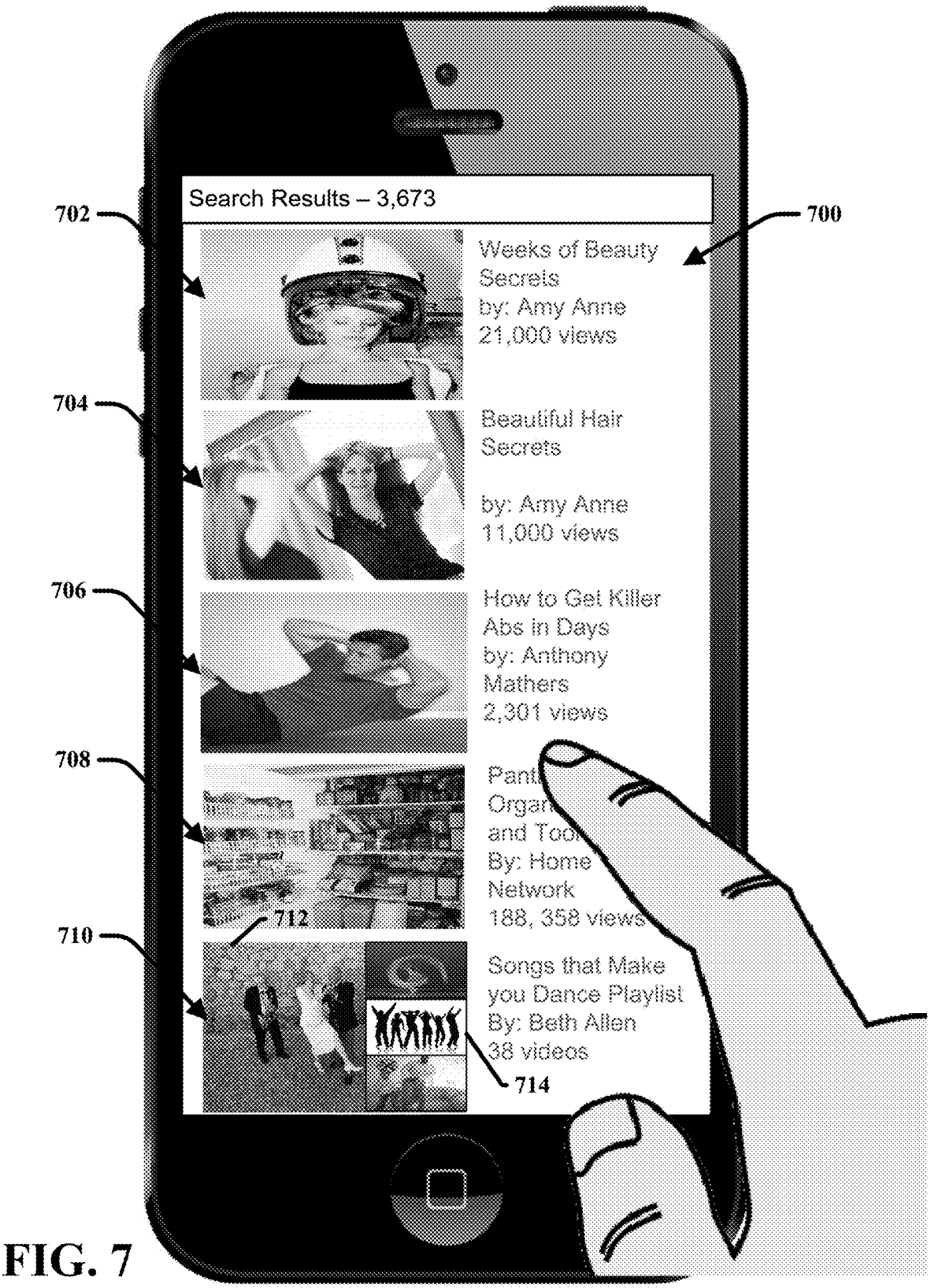
FIG. 7 illustrates a schematic representation of an example layout of a graphical interface display on a smartphone that includes a dynamic playlist thumbnail in accordance with various aspects and embodiments described herein.

Referring now to FIG. 7, presented is an example interface 700 displaying a list of media items 702-710 included in a search result. Interface 700 is displayed on a mobile phone (e.g., a smartphone) having a substantially smaller display screen size compared to that of a PC or tablet computer. The display screen includes touch screen capabilities to facilitate user interaction with interfaces displayed thereon.

Similar to interfaces 300-500, interface 700 includes a plurality of media items 702-710 respectively represented by thumbnails. Media items 702-708 are single videos. Media item 710 however is a video playlist entitled "Songs that make you dance" and includes a set of music videos. The thumbnail for media item 710 is noticeably different compared to the thumbnails for media items 702-708. In particular, the thumbnail representing the playlist is a dynamic thumbnail having a static portion 712 and a dynamic portion 714. The dynamic portion 716 includes three different images respectively representing videos included in the playlist. In an aspect, as a user interacts with interface 700 by touching the display screen and scrolling upward to view additional content of the search results, the images included in the dynamic portion 714 can change while the image included in the static portion 712 remains the same. For example, the images included in the dynamic portion 714 can be replaced with new images respectively representing additional videos included in the playlist.

Figure 8:
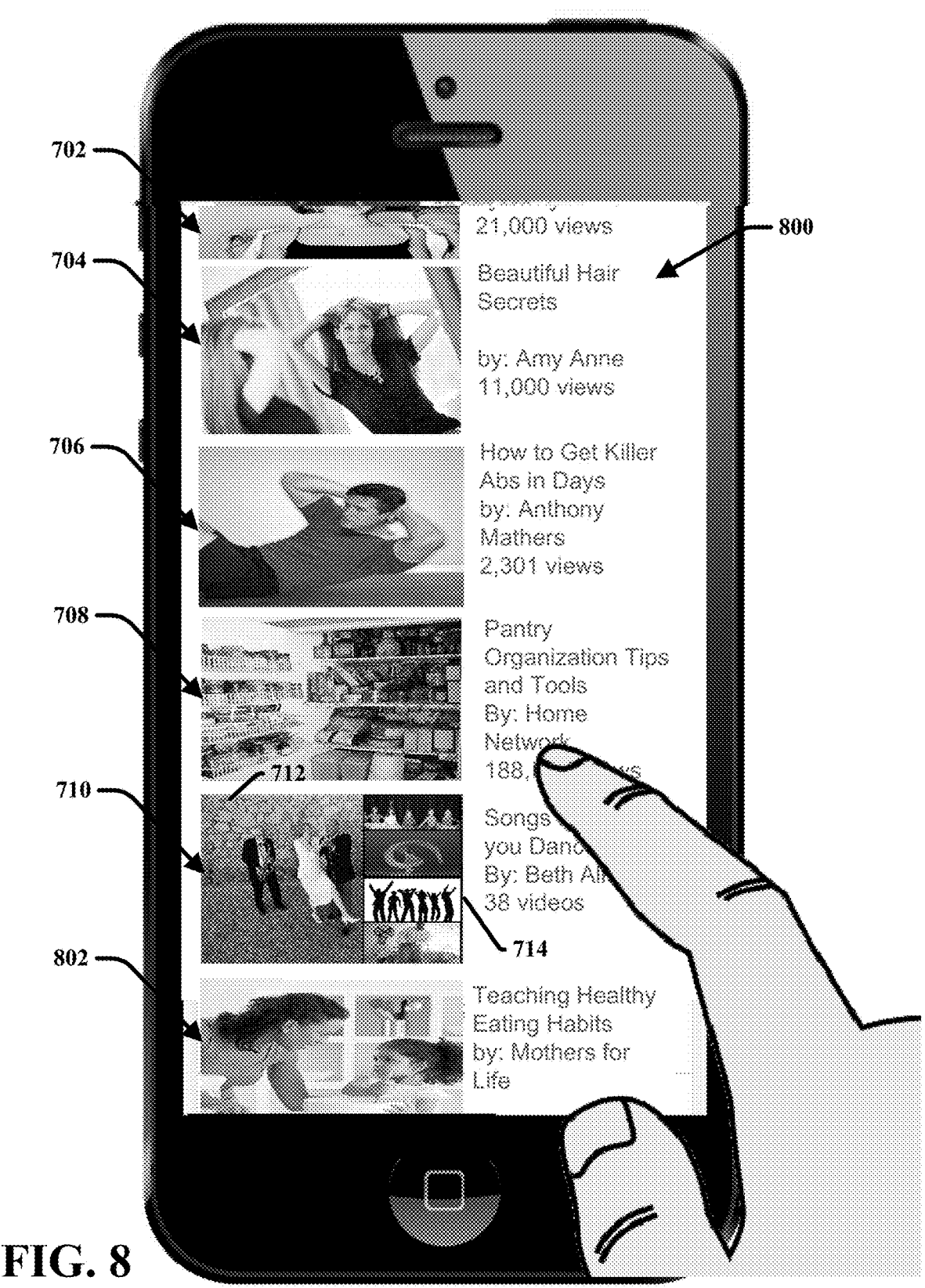
FIG. 8 illustrates a schematic representation of another example layout of a graphical interface display on a smartphone that includes a dynamic playlist thumbnail in accordance with various aspects and embodiments described herein.

FIG. 8 presents an example interface 800 displaying the search results associated with interface 700 of FIG. 4 in response to scrolling. In interface 800, the contents of the interface have shifted to reveal an additional media item 802 included in the search results. As the contents of the interface shift, the thumbnail representing playlist media item 710 shifts upward. This movement of the thumbnail causes the images included in the dynamic portion to scroll downward within the fixed dimensions of the dynamic portion 714. For example, the dynamic portion now includes two partial images and two full images.

Figure 9:
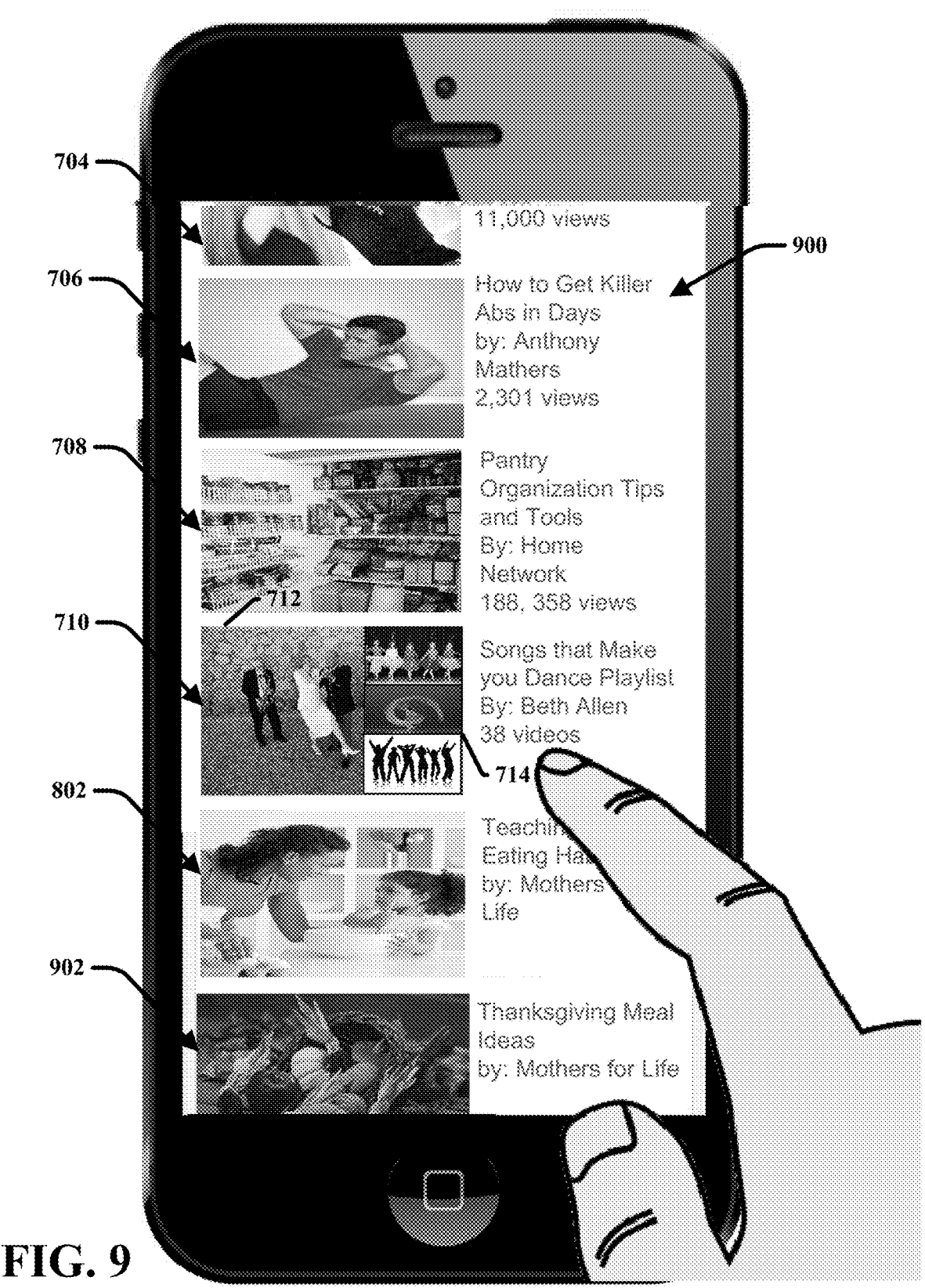
FIG. 9 illustrates a schematic representation of another example layout of a graphical interface display on a smartphone that includes a dynamic playlist thumbnail in accordance with various aspects and embodiments described herein.

FIG. 9 presents an example interface 900 displaying the search results associated with interface 800 of FIG. 8 in response to additional scrolling. In interface 900, the contents of the interface have shifted again to reveal an additional media item 902 included in the search results. As the contents of the interface shift in response to scrolling, dynamic thumbnail for the playlist media item 710 also shifts. This movement of the thumbnail causes the images included in the dynamic portion to continue to scroll downward within the fixed dimensions of the dynamic portion 714. For example, the dynamic portion 714 now includes three full images. It should be appreciated that additional scrolling of the contents of interface 900 will cause the images included in the dynamic portion to continue to scroll downward, revealing additional images representative of additional videos included in the playlist.

Figure 11:
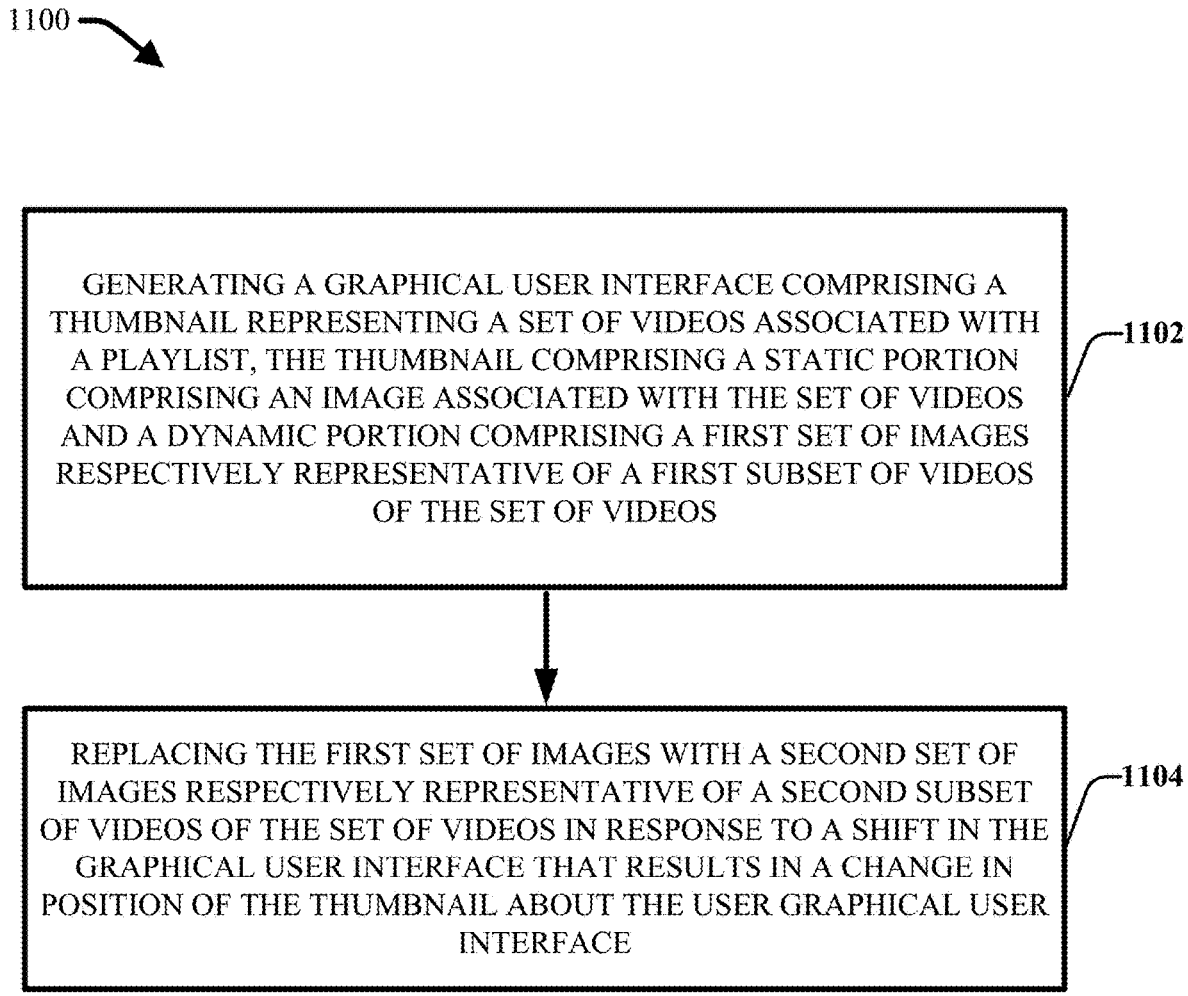
FIG. 11 is a flow diagram of another example method that facilitates generating an interface that includes a dynamic thumbnail representing a set of media items in accordance with various aspects and embodiments described herein.

In view of the example systems/interface described herein, example methods that can be implemented in accordance with the disclosed subject matter can be further appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 for distinguishing a playlist amongst other types of media items presented in a graphical user interface using a dynamic thumbnail to represent the playlist. At 1002, a graphical user interface is generated that includes a thumbnail representing a set of videos associated with a playlist (e.g., using thumbnail generation component 106). The thumbnail includes a static portion having a first image associated with the set of videos and a dynamic portion having one or more second images associated with the set of videos. At 1004, at least one of a position of the one or more second images provided in the dynamic portion is changed or an image included in the one or more second images is changed in response to a shift in the graphical user interface that results in a change in position of the thumbnail about the user graphical user interface (e.g., using thumbnail adaptation component 108).

FIG. 11 illustrates a flow chart of another example method 1100 for distinguishing a playlist amongst other types of media items presented in a graphical user interface using a dynamic thumbnail to represent the playlist. At 1102, a graphical user interface is generated that includes a thumbnail representing a set of videos associated with a playlist (e.g., using thumbnail generation component 106). The thumbnail includes a static portion having an image associated with the set of videos and a dynamic portion having a first set of images respectively representative of a first subset of videos of the set of videos. At 1104, the first set of images is replaced with a second set of images respectively representative of a second subset of videos of the set of videos in response to a shift in the graphical user interface that results in a change in position of the thumbnail about the user graphical user interface (e.g., using thumbnail adaptation component 108).

FIG. 12 illustrates a flow chart of another example method 1200 for distinguishing a playlist amongst other types of media items presented in a graphical user interface using a dynamic thumbnail to represent the playlist. At 1202, the one or more second images are shifted from a first position to a second position within the fixed display area in response to a shift in the graphical user interface that results in movement of the thumbnail. In an aspect, the one or more second images are shifted at a rate of movement slower than a rate of movement associated with the shift in the graphical user interface (e.g., using thumbnail adaptation component 108).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 13:
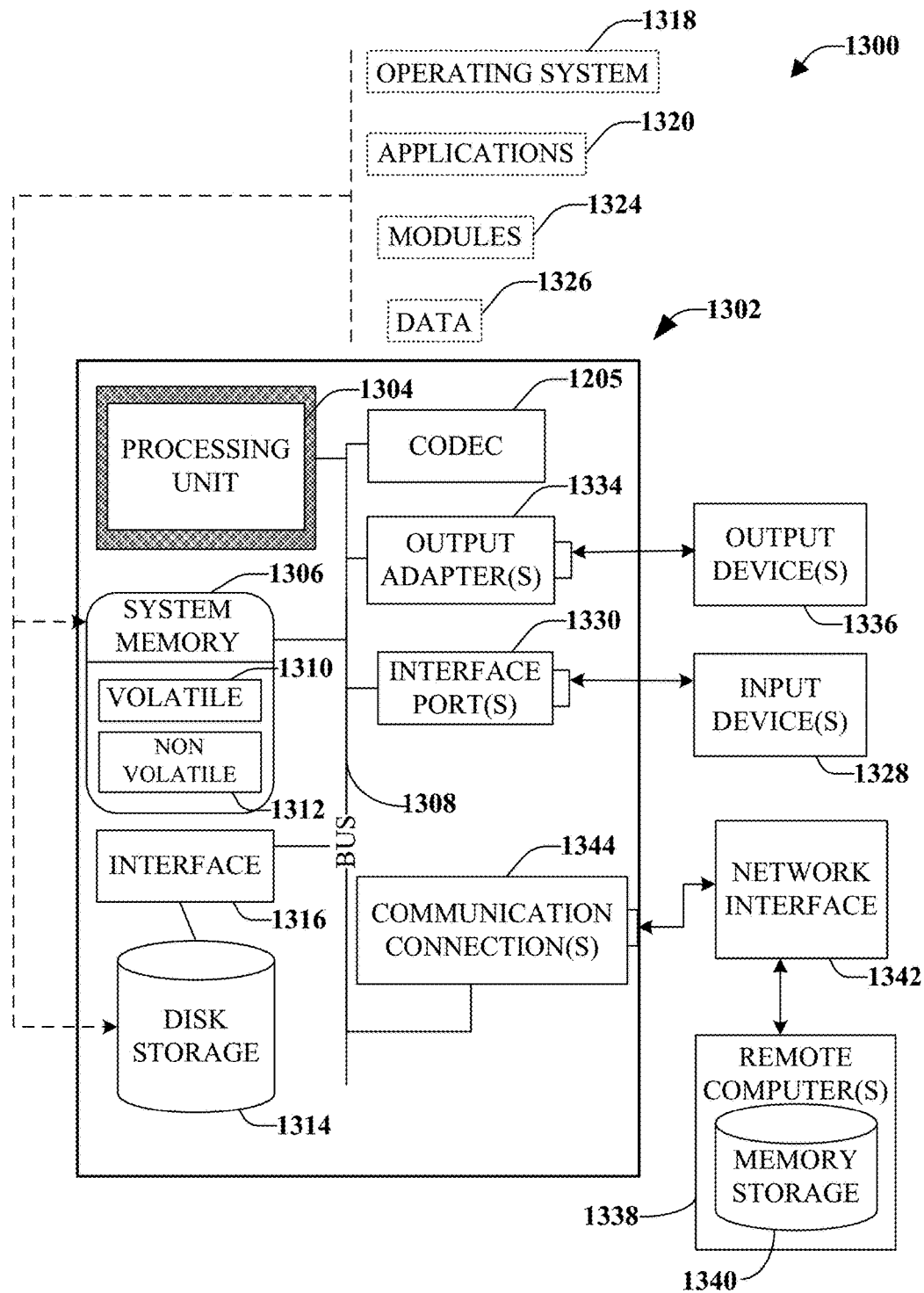
FIG. 13 is a schematic block diagram illustrating a suitable operating environment in accordance with various aspects and embodiments.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s). Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
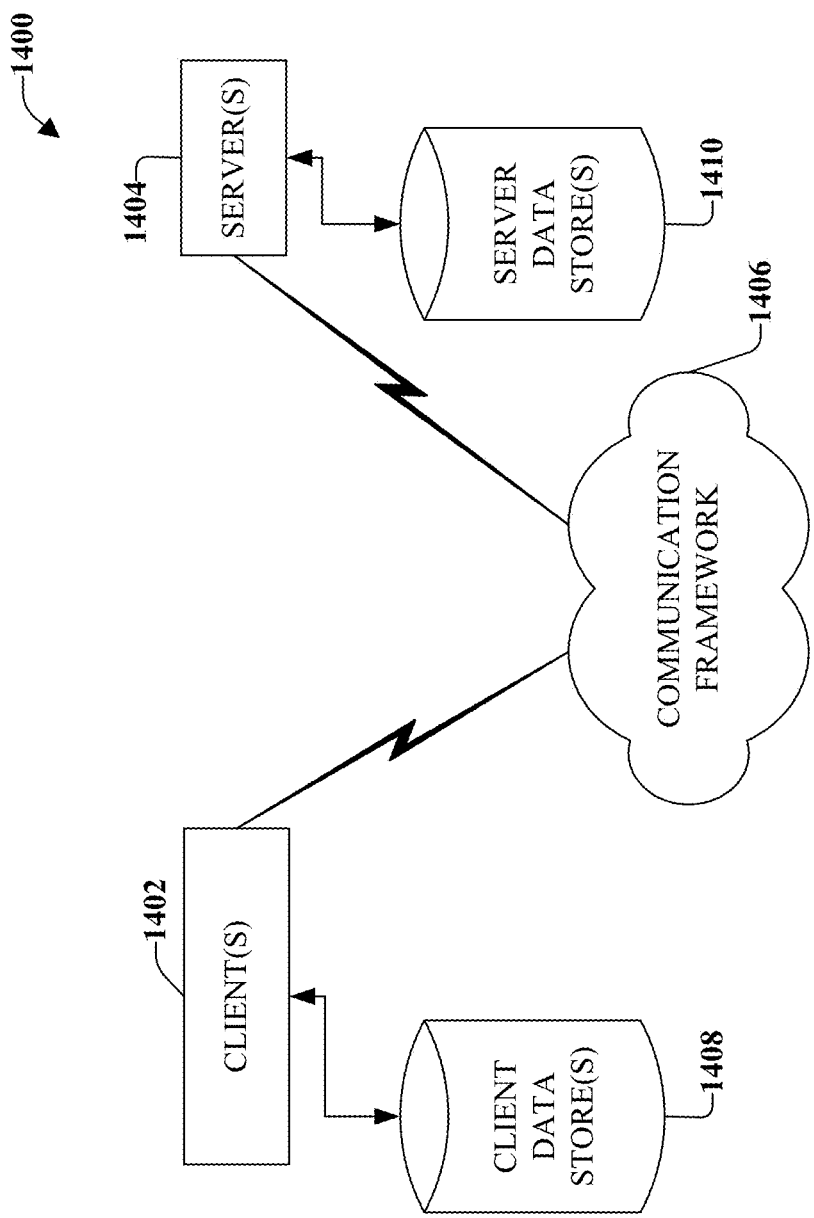
FIG. 14 is a schematic block diagram of a sample-computing environment in accordance with various aspects and embodiments.

Referring now to FIG. 14, there is illustrated a schematic block diagram of a computing environment 1400 in accordance with this disclosure. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a metadata, e.g., associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 1408 that can be employed to store information local to the client(s) 1402 (e.g., associated contextual information). Similarly, the server(s) 1404 are operatively include or are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory; and
   a processor that, when executing computer executable instructions stored in the memory, is configured to:
      generate a user interface that includes a thumbnail representing a plurality of media content items associated with a channel, wherein the thumbnail has a dynamic portion including a plurality of images that are each associated with one of the plurality of media content items selected from the channel and wherein the dynamic portion is configured to present at least one of the plurality of images in a fixed window while changing between one of the plurality of images in response to receiving one or more user interactions with the user interface;
      detect a shift in the user interface that results in a change in position of the thumbnail about the user interface; and
      in response to detecting the shift in the user interface, replace an image from the plurality of images from being presented in the fixed window of the dynamic portion of the thumbnail with another image from the plurality of images, wherein the another image is presented in the fixed window of the dynamic portion of the thumbnail.

2. The system of claim 1, wherein the thumbnail also has a static portion including an image associated with a media content item of the plurality of media content items and wherein the processor is further configured to inhibit the image associated with the static portion of the thumbnail from changing while changing the image from the plurality of images to the another image from the plurality of images associated with the dynamic portion of the thumbnail.

3. The system of claim 1, wherein the dynamic portion is configured to change between one of the plurality of images in response to a change in position of the thumbnail in the user interface and wherein the image from the plurality of images is changed to the another image from the plurality of images associated with the dynamic portion of the thumbnail in response to detecting navigation in the user interface that has changed the position of the thumbnail within the user interface.

4. The system of claim 3, wherein the dynamic portion comprises a fixed display area and wherein the image in the dynamic portion is configured to move from a first position to a second position within the fixed display area in response to the change in position of the thumbnail in the user interface.

5. The system of claim 3, wherein the image is configured to move from a first position to a second position within a fixed display area at a different rate of movement than a rate of movement associated with the change in position of the thumbnail in the user interface.

6. The system of claim 3, wherein the dynamic portion comprises a fixed display area, wherein the plurality of images respectively representative of the plurality of media content items are configured to scroll across the fixed display area in response to the change in position of the thumbnail in the user interface.

7. The system of claim 1, wherein the dynamic portion is configured to change between one of the plurality of images in response to a particular period of time elapsing.

8. A method comprising:
generating, using a hardware processor, a user interface that includes a thumbnail representing a plurality of media content items associated with a channel, wherein the thumbnail has a dynamic portion including a plurality of images that are each associated with one of the plurality of media content items selected from the channel and wherein the dynamic portion is configured to present at least one of the plurality of images in a fixed window while changing between one of the plurality of images in response to receiving one or more user interactions with the user interface;
detecting, using the hardware processor, a shift in the user interface that results in a change in position of the thumbnail about the user interface; and
in response to detecting the shift in the user interface, replacing, using the hardware processor, an image from the plurality of images from being presented in the fixed window of the dynamic portion of the thumbnail with another image from the plurality of images, wherein the another image is presented in the fixed window of the dynamic portion of the thumbnail.

9. The method of claim 8, wherein the thumbnail also has a static portion including an image associated with a media content item of the plurality of media content items and wherein the method further comprises inhibiting the image associated with the static portion of the thumbnail from changing while changing the image from the plurality of images to the another image from the plurality of images associated with the dynamic portion of the thumbnail.

10. The method of claim 8, wherein the dynamic portion is configured to change between one of the plurality of images in response to a change in position of the thumbnail in the user interface and wherein the image from the plurality of images is changed to the another image from the plurality of images associated with the dynamic portion of the thumbnail in response to detecting navigation in the user interface that has changed the position of the thumbnail within the user interface.

11. The method of claim 10, wherein the dynamic portion comprises a fixed display area and wherein the image in the dynamic portion is configured to move from a first position to a second position within the fixed display area in response to the change in position of the thumbnail in the user interface.

12. The method of claim 10, wherein the image is configured to move from a first position to a second position within a fixed display area at a different rate of movement than a rate of movement associated with the change in position of the thumbnail in the user interface.

13. The method of claim 10, wherein the dynamic portion comprises a fixed display area, wherein the plurality of images respectively representative of the plurality of media content items are configured to scroll across the fixed display area in response to the change in position of the thumbnail in the user interface.

14. The method of claim 8, wherein the dynamic portion is configured to change between one of the plurality of images in response to a particular period of time elapsing.

15. A non-transitory computer-readable medium containing computer executable instructions that, when executed by a processor, cause the processor to perform a method, the method comprising:
generating a user interface that includes a thumbnail representing a plurality of media content items associated with a channel, wherein the thumbnail has a dynamic portion including a plurality of images that are each associated with one of the plurality of media content items selected from the channel and wherein the dynamic portion is configured to present at least one of the plurality of images in a fixed window while changing between one of the plurality of images in response to receiving one or more user interactions with the user interface;
detecting a shift in the user interface that results in a change in position of the thumbnail about the user interface; and
in response to detecting the shift in the user interface, replacing an image from the plurality of images from being presented in the fixed window of the dynamic portion of the thumbnail with another image from the plurality of images, wherein the another image is presented in the fixed window of the dynamic portion of the thumbnail.

16. The non-transitory computer-readable medium of claim 15, wherein the thumbnail also has a static portion including an image associated with a media content item of the plurality of media content items and wherein the method further comprises inhibiting the image associated with the static portion of the thumbnail from changing while changing the image from the plurality of images to the another image from the plurality of images associated with the dynamic portion of the thumbnail.

17. The non-transitory computer-readable medium of claim 15, wherein the dynamic portion is configured to change between one of the plurality of images in response to a change in position of the thumbnail in the user interface and wherein the image from the plurality of images is changed to the another image from the plurality of images associated with the dynamic portion of the thumbnail in response to detecting navigation in the user interface that has changed the position of the thumbnail within the user interface.

18. The non-transitory computer-readable medium of claim 17, wherein the dynamic portion comprises a fixed display area and wherein the image in the dynamic portion is configured to move from a first position to a second position within the fixed display area in response to the change in position of the thumbnail in the user interface.

19. The non-transitory computer-readable medium of claim 17, wherein the image is configured to move from a first position to a second position within a fixed display area at a different rate of movement than a rate of movement associated with the change in position of the thumbnail in the user interface.

20. The non-transitory computer-readable medium of claim 17, wherein the dynamic portion comprises a fixed display area, wherein the plurality of images respectively representative of the plurality of media content items are configured to scroll across the fixed display area in response to the change in position of the thumbnail in the user interface.

21. The non-transitory computer-readable medium of claim 8, wherein the dynamic portion is configured to change between one of the plurality of images in response to a particular period of time elapsing.

* * * * *